(12) United States Patent
Petruska et al.

(10) Patent No.: US 7,282,006 B2
(45) Date of Patent: *Oct. 16, 2007

(54) POWER TRANSMISSION DEVICE WITH THERMALLY COMPENSATING BEARING PRELOAD MECHANISM

(75) Inventors: Paul H. Petruska, Royal Oak, MI (US); Benjamin J. Walker, Ortonville, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/705,166

(22) Filed: Feb. 9, 2007

(65) Prior Publication Data

US 2007/0155578 A1    Jul. 5, 2007

Related U.S. Application Data

(63) Continuation of application No. 11/039,691, filed on Jan. 20, 2005, now Pat. No. 7,175,560.

(51) Int. Cl.
 *F16H 48/06* (2006.01)
(52) U.S. Cl. .................. 475/230; 384/905; 384/557
(58) Field of Classification Search ............. 384/905, 384/557, 493, 563, 626; 475/245–247, 230; 74/607
See application file for complete search history.

(56) References Cited

U.S. PATENT DOCUMENTS

| | | | |
|---|---|---|---|
| 2,542,405 A | 2/1951 | Fink | |
| 2,980,572 A | 4/1961 | Bagdon et al. | |
| 3,730,600 A | 5/1973 | Degnan | |
| 4,033,644 A | 7/1977 | Reneerkens | |
| 4,226,485 A | 10/1980 | Pravot | |
| 4,526,641 A | 7/1985 | Schriever et al. | |
| 4,725,153 A | 2/1988 | Tsuruki | |
| 4,732,497 A | 3/1988 | Sawa et al. | |
| 4,848,939 A | 7/1989 | Ludwig | |
| 4,910,846 A | 3/1990 | Andreasson et al. | |
| 5,028,152 A | 7/1991 | Hill et al. | |
| 5,110,223 A | 5/1992 | Koch et al. | |
| 5,115,558 A | 5/1992 | Bernhardt et al. | |
| 5,293,688 A | 3/1994 | Koch et al. | |
| 5,598,747 A | 2/1997 | Schetter et al. | |
| 5,624,345 A | 4/1997 | Graft et al. | |
| 5,795,037 A | 8/1998 | Hagelthorn | |
| 6,250,815 B1 | 6/2001 | Picone et al. | |
| 6,273,614 B1 | 8/2001 | Nicot | |
| 6,398,689 B1 | 6/2002 | Morse et al. | |
| 6,422,757 B1 | 7/2002 | Wu et al. | |
| 6,460,268 B1 | 10/2002 | Hoefer | |

(Continued)

*Primary Examiner*—Charles A. Marmor
*Assistant Examiner*—Justin K. Holmes
(74) *Attorney, Agent, or Firm*—Harness, Dickey & Pierce, P.L.C.

(57) ABSTRACT

A power transmission device includes a housing, a differential assembly having a case and a bearing assembly rotatably supporting the case within the housing. A preload is applied to the bearing assembly along a load path. A shim is positioned in the load path with the bearing assembly. The shim is constructed at least in part from a material having a predetermined coefficient of thermal expansion such that the shim is operable to compensate for different rates of thermal expansion in the components within the load path to maintain a desired bearing preload or a range of operating temperatures.

25 Claims, 4 Drawing Sheets

U.S. PATENT DOCUMENTS

| | | |
|---|---|---|
| 6,474,873 B1 | 11/2002 | Krisher et al. |
| 6,533,697 B2 | 3/2003 | Morse et al. |
| 6,544,140 B2 | 4/2003 | Grada et al. |
| 6,796,031 B1 | 9/2004 | Russell |
| 2006/0018582 A1 | 1/2006 | Gradu et al. |

POWER TRANSMISSION DEVICE WITH THERMALLY COMPENSATING BEARING PRELOAD MECHANISM

CROSS-REFERENCE TO RELATED APPLICATIONS

This application is a continuation of U.S. patent application Ser. No. 11/039,691 filed on Jan. 20, 2005, now U.S. Pat. No. 7,175,560. The disclosure of the above application is incorporated herein by reference.

BACKGROUND OF THE INVENTION

The invention relates to power transmission devices and, more particularly, to a device operable to maintain a desired preload on a bearing in an axle assembly.

It is known to rotatably support a differential case in an axle assembly housing using a pair of bearing assemblies. The bearing assemblies are typically constructed to have an inner race, an outer race and a plurality of rollers positioned between the inner race and the outer race. To achieve long bearing life during vehicle operation, it has been found that an axial preload positively affects bearing life.

Some axle assemblies include adjustment mechanisms operable to apply a desired preload to a bearing assembly. During axle assembly, an adjustment nut is typically rotated until a desired preload is met and then the adjustment nut is fixed at that rotational position. Alternately, portions of the axle housing may be separated by application of an external force while the differential assembly and bearings are installed within the axle housing. After installation of the bearings and differential assembly, the force applied to the axle housing is released to provide an axial load to the bearing assemblies.

While these methods have functioned well in the past to provide a desired bearing preload, improvements may be made. Specifically, a concern regarding maintaining the desired bearing preload exists when the axle assembly is constructed using a variety of materials having different coefficients of thermal expansion. Specifically, some axle assembly housings are created using aluminum while the differential case may be constructed from cast iron or steel. As the operating temperature of the axle assembly varies, specific components expand and contract at different rates. As such, the bearing preload set at a specific temperature varies as the temperature deviates from the initial build condition.

SUMMARY OF THE INVENTION

The present invention includes a power transmission device including a housing, a differential assembly having a case, and a bearing assembly rotatably supporting the case within the housing. A preload is applied to the bearing assembly along a load path. A shim is positioned in the load path with the bearing assembly. The shim is constructed at least in part from a material having a predetermined coefficient of thermal expansion in such that the shim is operable to compensate for different rates of thermal expansion in the components within the load path to maintain a desired bearing preload over a range of operating temperatures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
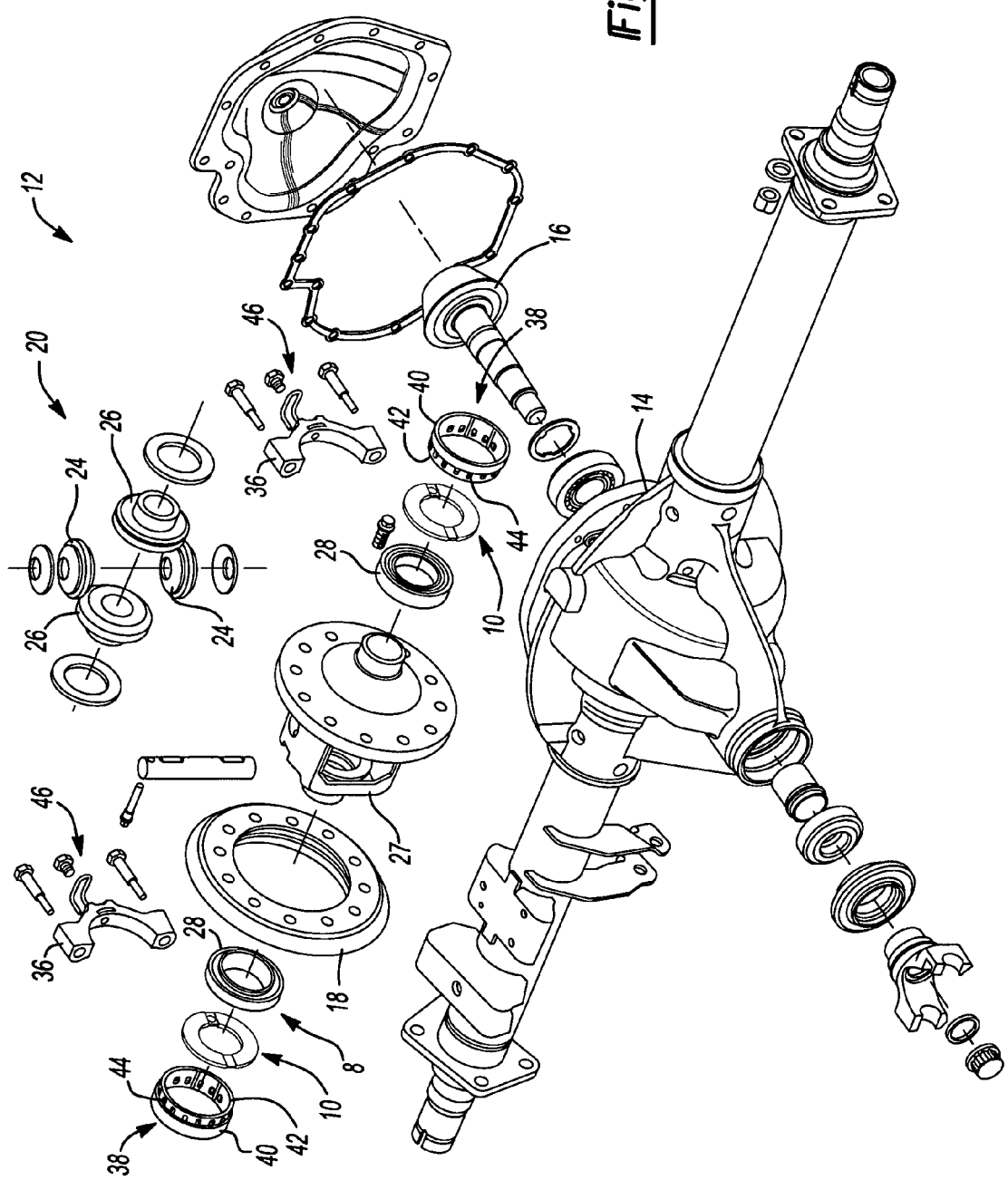
FIG. 1 is an exploded perspective view of a first embodiment drive axle constructed in accordance with the teachings of the present invention.

With reference to the drawings, a thermally compensating bearing preload arrangement constructed in accordance with the teachings of the embodiment of the present invention is generally identified at reference number 8. The bearing arrangement includes a shim 10 operatively associated with an exemplary drive axle assembly 12. As particularly shown in FIGS. 1 and 2, the drive axle assembly 12 is illustrated to generally include an axle housing 14 for rotatably mounting a hypoid gear set including a pinion gear 16 and a ring gear 18 drivingly interconnected to a differential assembly 20. The differential assembly 20 functions to transfer power to a pair of axle shafts (not shown) while compensating for any difference in axle shaft speed rotation as may occur during a turn or other steering maneuver. In order to compensate for a differential in axle shaft rotational speed, the differential assembly 20 includes a pair of pinion gears 24 and a pair of side gears 26 drivingly interconnected to the axle shafts. To facilitate proper function of the axle assembly 12, the differential assembly 20 includes a case 27 rotatably mounted on a pair of differential bearings 28. Each differential bearing 28 includes an inner race 30, an outer race 32 and a plurality of rollers 34 positioned between the inner and outer races. The axle housing 14 includes two semi-circular journals (not shown) for supporting approximately 180 degrees of the circumference of each of the differential bearings 28. A pair of bearing caps 36 journally support the remaining approximate one-half of each of the differential bearings 28. Each bearing cap 36 is mounted to the axle housing 14 in a manner conventional in the art such as via threaded fasteners.

Figure 2:
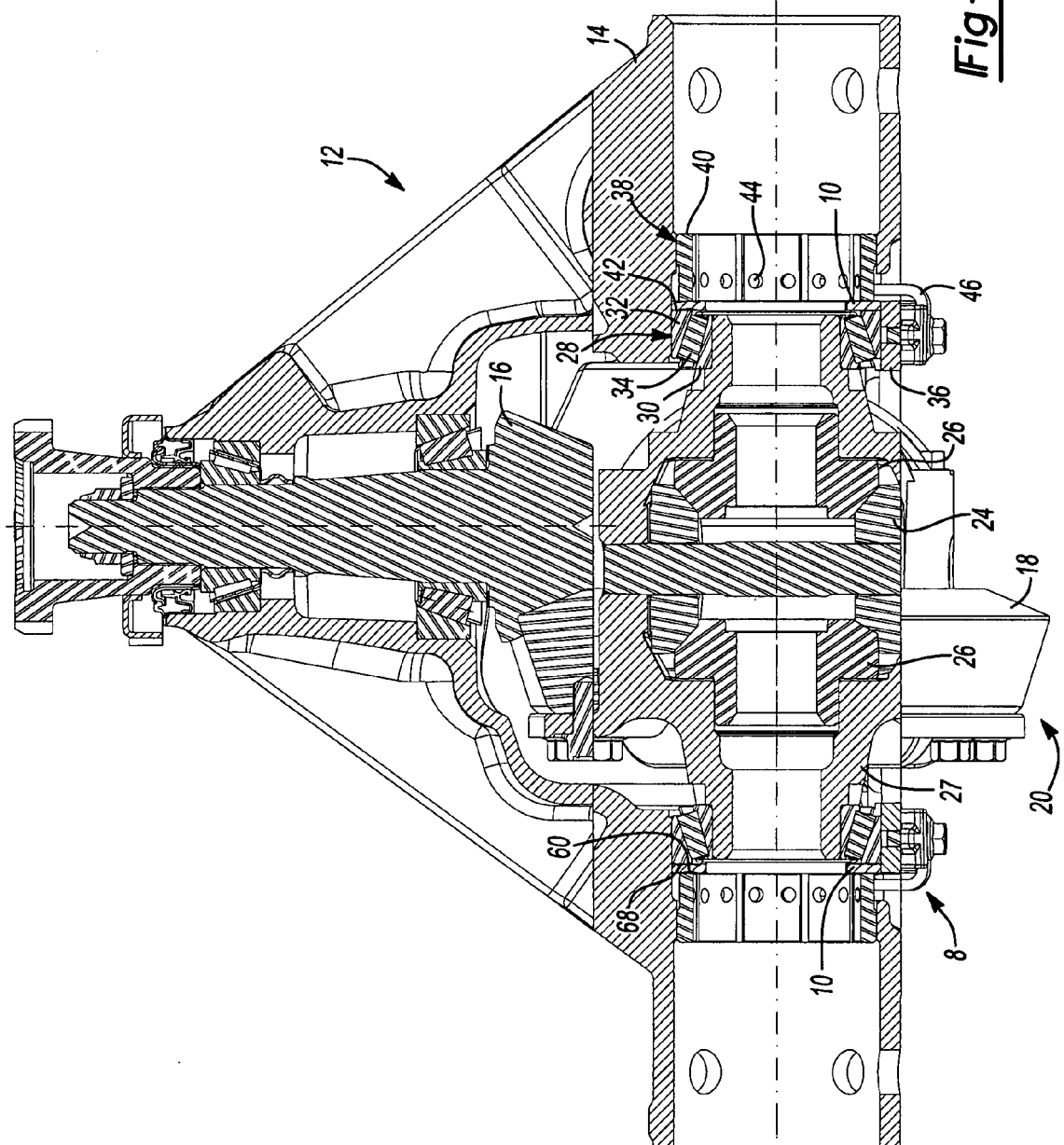
FIG. 2 is a cross-sectional view of a portion of the axle assembly depicted in FIG. 1.

To assure optimum differential bearing life and proper pinion gear to ring gear engagement, a pair of adjustment nuts 38 are provided. As shown in FIG. 2, each adjustment nut 38 has a first end 40 threadingly engaged with the axle housing 14 and a second end 42 abuttingly engaged with the differential bearing 28 such that rotation of the adjustment nut 38 axially displaces the differential bearing 28. Each adjustment nut 38 further includes a plurality of retention apertures or slots 44 for receipt of a portion of an adjuster lock 46. Adjuster lock 46 restricts adjustment nut 38 from rotation after a proper bearing preload has been applied.

FIG. 2 depicts shim 10 positioned between adjustment nut 38 and outer race 32 of differential bearing 28. Shim 10 is operable to maintain a desired preload on differential bearing 28 through a range of operating temperatures. Specifically, shim 10 functions to compensate for changes in the size of components located within the load path that extends through differential bearing 28 to thereby maintain a relatively consistent preload on differential bearing 28. For example, in the embodiment disclosed in FIG. 2, load is transferred in a load path that extends through axle housing 14, adjustment nut 38, shim 10, outer race 32, rollers 34 and inner race 30 and case 27. As previously mentioned, it has been found to be beneficial to maintain a compressive preload between inner race 30 and outer race 32 of differential bearing 28 during operation. Because materials having different coefficients of thermal expansion can be located within the load path, a mechanism that accommodates for differences in the thermal expansion of these materials can be beneficial.

Figures 3, 4:
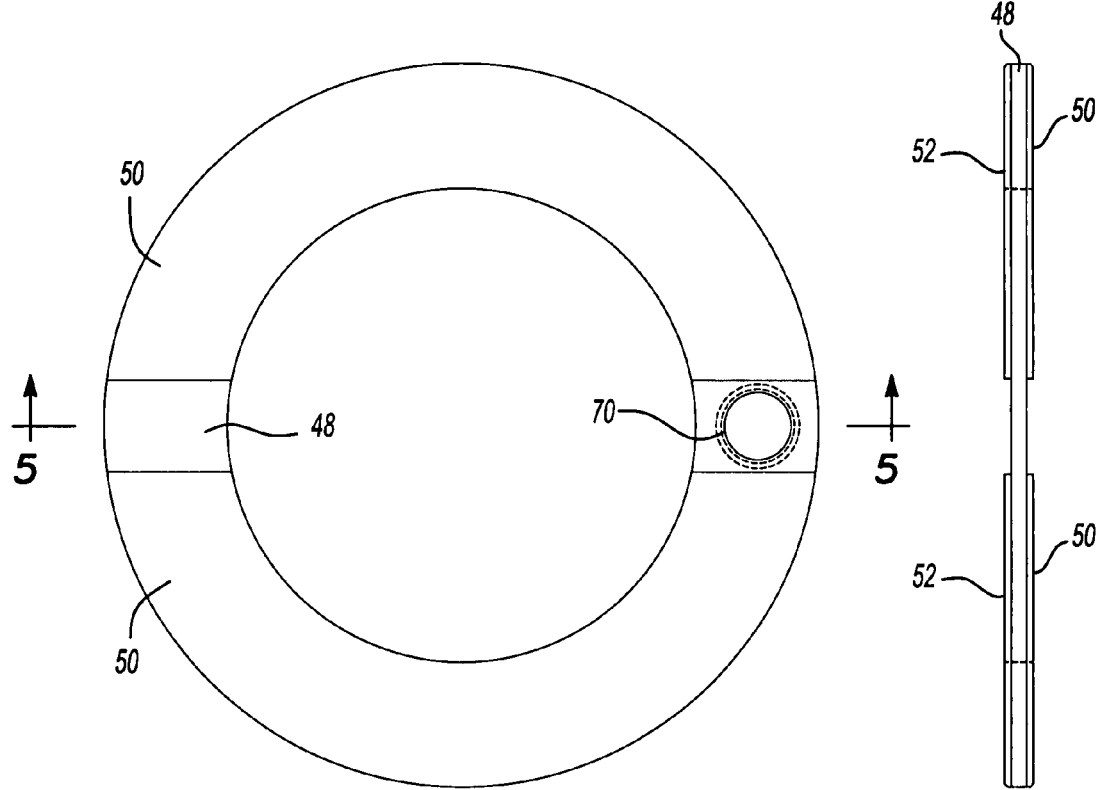
FIG. 3 is a planar view of an exemplary thermally compensating shim.
FIG. 4 is a side view of the shim depicted in FIG. 3.
Figure 5:
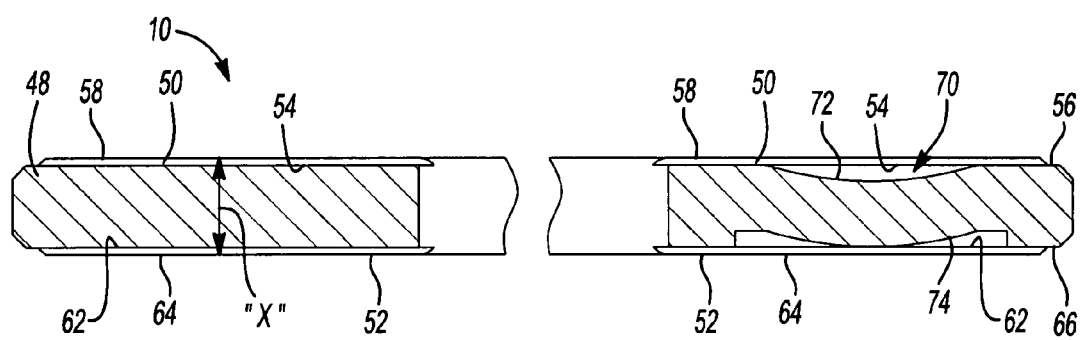
FIG. 5 is a cross-sectional view of the shim taken along line 5-5 shown in FIG. 3.

FIGS. 3-5 depict shim 10 in greater detail. Shim 10 includes a substantially cylindrically-shaped body 48. Body 48 may be constructed by injection molding a polymeric material into a mold. The polymeric material may have a coefficient of thermal expansion greater than the coefficient of thermal expansion of any other component placed within the differential bearing load path. In this manner, the material of shim 10 increases at a greater rate than the material of the other components within the differential bearing load path. Specifically, it is contemplated that axle housing 14 may be constructed from a material such as aluminum. The case 27 may be constructed from cast iron. The inner race 30, the outer race 32 and the rollers 34 may be constructed from a hardenable machine steel. The axle housing 14, being constructed from aluminum, would have a higher coefficient of thermal expansion than the case 27, the inner race 30, the outer race 32 and the rollers 34.

If a drive axle assembly is constructed without shim 10 and the components are at room temperature, the bearing preload will be within a desired range when each of the components are at that temperature. If the temperature elevates during operation, axle housing 14 will expand at a greater rate than the other components. Based on the position of the components within the differential bearing load path, it is contemplated that the differential bearing preload will decrease if the temperature increases from the assembly temperature. Similarly, if axle housing 14 reduces in size an amount greater than case 27 and bearing assembly 28 during a temperature decrease, a bearing preload increase will likely occur. Therefore, the preload on differential bearing 28 depends on the change in temperature between the operating temperature and the assembly temperature. As previously described, shim 10 operates to maintain the differential bearing preload within a desirable range by changing size at a greater rate per change in temperature to account for the change of size in axle housing 14 relative to the change in size of the other steel or iron components.

Shim 10 includes a first pair of plates 50 and a second pair of plates 52 coupled to body 48. Each first plate 50 includes a first surface 54 engaging a first surface 56 of body 48. A second surface 58 of first plate 50 engages an end face 60 of adjustment nut 38. Similarly, each second plate 52 includes a first surface 62 and an opposite second surface 64. First surface 62 engages a second surface 66 of body 48. Second surface 64 of second plate 52 engage an end face 68 of outer race 32.

Body 48 includes a gate mark 70 formed during the injection molding and subsequent body cooling processes. Gate mark 70 may be shaped as a reduced thickness portion including a recessed first surface 72 offset from first surface 56 as well as a recessed second surface 74 offset from second surface 66. Depending on the manufacturing process used, first surface 72 and/or second surface 74 may not be recessed but may protrude outwardly beyond first surface 56 or second surface 66. Accordingly, first plates 50 are spaced apart from one another at the location of gate mark 70. Similarly, second plates 52 are spaced apart from one another at gate mark 70.

One skilled in the art will appreciate that while four plates are shown in the embodiment depicted in FIGS. 3-5, other embodiments having one, two or three plates are also contemplated. The embodiments with fewer plates are not outside the scope of the present invention. For example, if body 48 is manufactured in a manner such that gate mark 70 is always at or below first surface 56 and second surface 66, two closed ring, washer-like plates may be implemented instead of the four plates previously described. Additionally, another embodiment is contemplated where only first surface 56 or second surface 66 of body 48 includes a plate coupled thereto. First plates 50 and second plates 52 function to distribute load across shim 10. If it is determined that the material used to construct body 48 is of sufficient compressive strength, the shim plates located on one side of body 48 may be eliminated.

Regardless of number or shape, the plates may be coupled to body 48 during the injection molding process or at a later time. Adhesives or other bonding techniques may be used to couple the body and plates as well. Alternatively, the plates may be installed as separate components in contact with body 48.

Figure 6:
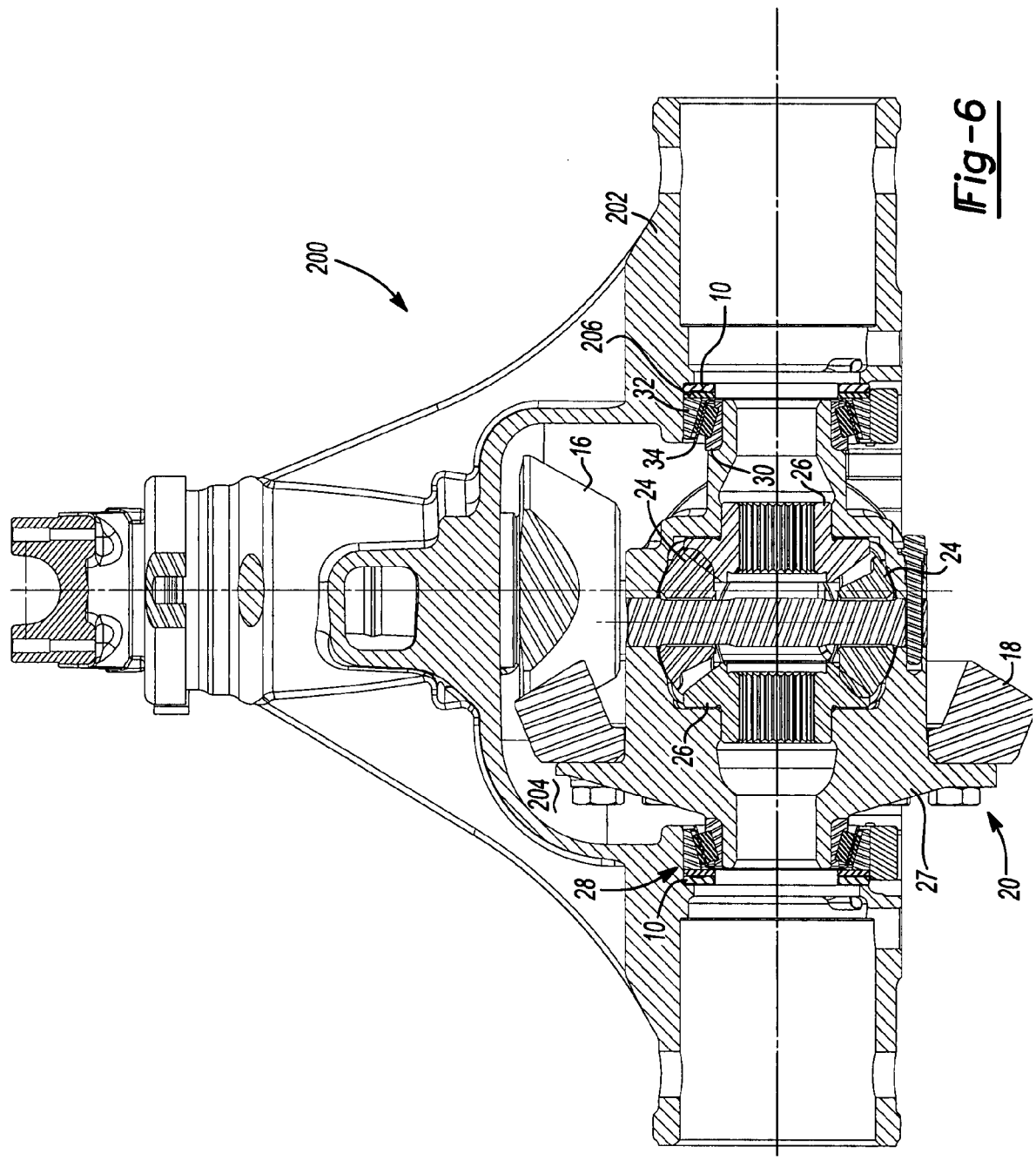
FIG. 6 is a cross-sectional view of a portion of a second embodiment drive axle assembly constructed in accordance with the teachings of the present invention.

An alternate embodiment axle assembly 200 is depicted at FIG. 6. Axle assembly 200 is substantially similar to axle assembly 12 except that adjustment nuts are not utilized to impart the differential bearing preload. Like elements will retain their previously introduced reference numerals.

Axle assembly 200 includes differential bearings 28 rotatably supporting case 27 as previously described with reference to drive axle assembly 12. However, adjustment nuts 28 and adjuster locks 36 are not required in the embodiment disclosed in FIG. 6. To impart a desirable differential bearing preload, portions of an axle housing 202 are deflected outwardly to increase the size of an opening 204 within axle housing 202. Differential assembly 20 and differential bearings 28 are placed within opening 204 while the opening is being enlarged by mechanical force. After the differential assembly 20, along with differential bearings 28, are properly positioned within axle housing 202, the force enlarging opening 204 is released. The axle housing 202 springs back to an undeformed shape and imparts the desired differential bearing preload, To account for variation in machining of the various axle assembly components and to achieve the desired differential bearing preload, a spacer 206 may be placed within the bearing preload path. Alternatively, a family of shims similar to shim 10 may be constructed with different thicknesses to provide the desired initial bearing preload as well as a mechanism for maintaining the bearing preload over varying operating temperatures.

FIG. 6 depicts shim 10 being positioned between outer race 32 and axle housing 202. One skilled in the art will appreciate that a shim similar to shim 10 may alternatively be positioned between inner race 30 and differential case 27 without departing from the scope of the invention. Furthermore, the materials discussed were merely exemplary and it should be appreciated that the thermally compensating preload arrangement previously described is operable to account for dissimilar thermal coefficients of expansion between any number of materials.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

What is claimed is:

1. An axle assembly, comprising:
   an axle housing;
   a differential assembly having a case;
   first and second laterally spaced bearings rotatably supporting said case in said housing;
   a preload mechanism for applying a preload to at least one of said first and second bearings along a load path defined between said housing and said case; and
   a shim positioned in said load path between said first bearing and one of said housing and said case, said shim including a body, a first metal load distributing element and a second metal load distributing element, said first metal load distributing element is coupled to a first side of said body and said second metal load distributing element is coupled to a second side of said body with one of said first and second metal load distributing elements abutting said first bearing, said body is formed of a material having a predetermined coefficient of thermal expansion and is operable to at least partially compensate for different rates of thermal expansion in a plurality of components located within said load path to maintain said preload, wherein at least one of said first and second metal load distributing elements does not extend fully around said body.

2. The axle assembly of claim 1 wherein said body is formed of plastic.

3. The axle assembly of claim 1 wherein said shim includes a third metal load distributing element that is coupled to said first side of said body and is spaced apart from said first metal load distributing element.

4. The axle assembly of claim 3 wherein said shim includes a fourth metal load distributing element that is coupled to said second side of said body.

5. The axle assembly of claim 4 wherein said second and fourth metal load distributing elements are spaced apart from one another.

6. The axle assembly of claim 1, wherein said first bearing includes an inner race, an outer race and a plurality of roller elements positioned between said inner and outer races, and wherein said shim engages one of said inner and outer races.

7. The axle assembly of claim 6 wherein said shim engages said outer race of said first bearing and said housing.

8. The axle assembly of claim 1 wherein said housing is constructed from a material having a coefficient of thermal expansion greater than a coefficient of thermal expansion of a material from which said case is constructed.

9. The axle assembly of claim 8 wherein said shim is constructed from at least one material having a coefficient of thermal expansion greater than a coefficient of thermal expansion of a material from which said housing is constructed.

10. The axle assembly of claim 1 wherein said preload mechanism includes a threaded member that is threadably coupled to said housing, said threaded member being rotatable about and axially movable for adjusting said preload applied by said shim on said first bearing.

11. The axle assembly of claim 1 further comprising a second shim positioned in said load path between said second bearing and one of said housing and said case.

12. The axle assembly of claim 11 wherein said preload mechanism includes an adjustment member moveable relative to said housing and said first bearing so as to apply said preload to said first bearing.

13. The axle assembly of claim 12 wherein said preload mechanism further Includes a second adjustment member operable for applying said preload to said second bearing.

14. The axle assembly of claim 11 wherein said second shim is formed of a material having a coefficient of thermal expansion greater than a coefficient of thermal expansion for a material from which said housing Is constructed.

15. An axle assembly, comprising:
   a housing;
   a differential assembly having a case; a bearing rotatably supporting said case for rotation In said housing, said bearing being positioned in a load path defined between said housing and said case alon which a compressive preload is applied to said bearing; and
   a shim positioned in said load path between said bearing and one of said housing and said case, said shim including a body, a first metal plate, a second metal plate and a third metal plate, said first metal plate being coupled to a first side of said body, said second metal plate being coupled to a second side of said body, said third metal plate being coupled to said first side and spaced apart from said first metal plate, at least one of the first, second and third metal plates abutting said bearing, wherein said body is formed of a material having a predetermined coefficient of thermal expansion and is operable to at least partially compensate for different rates of thermal expansion in a plurality of components within said load path to maintain said compressive preload over a predetermined range of operating temperatures.

16. The axle assembly of claim 15, further comprising:
   a second bearing coupled to said housing and rotatably supporting said case on
   a side of said case opposite said first bearing, said second bearing being positioned in said load path; and
   a second shim positioned in said load path between said second bearing and said housing or said case.

17. The axle assembly of claim 16 wherein second shim is constructed from a material and configured to cooperate with said first shim to compensate for different rates of thermal expansion in components within said load path to maintain said compressive preload over said predetermined range of operating temperatures.

18. The power transmission device of claim 15 wherein said body is formed of plastic.

19. The axle assembly of claim 18 wherein said body is substantially cylindrically shaped and includes an aperture extending therethrough.

20. The axle assembly of claim 19 wherein said shim includes a fourth metal plate that is coupled to said second side of said body.

21. The axle assembly of claim 15 wherein said bearing includes an inner race, an outer race and a plurality of elements positioned between said inner and outer races, and wherein said shim engages one of said inner and outer races.

22. The axle assembly of claim 21 wherein said shim engages said outer race of said bearing and said housing.

23. The axle assembly of claim 15 wherein said shim is constructed from at least one material having a coefficient of thermal expansion greater than a coefficient of thermal expansion of a material from which said housing is constructed.

24. The axle assembly of claim 15 further including a threaded member that is threadably coupled to said housing, said threaded member is rotatable and axially movable to apply said preload to said bearing.

25. A drive axle assembly comprising:
an axle housing;
an input shaft having a pinion gear and which is rotatably supported in said axle housing by a first bearing;
a differential assembly having a case, a ring gear fixed to said case that is meshed with said pinion gear, and second and third bearings rotatably supporting said case in said housing; and
a shim positioned between said axle housing and one of said first, second and third bearings, said shim including a body, a first metal load distributing element and a second metal load distributing element, said first metal load distributing element is coupled to a first side of said body and said second metal load distributing element is coupled to a second side of said body opposite said first side, one of said first and second metal load distributing elements abuts said first bearing, said body is formed of a material having a predetermined coefficient of thermal expansion operable to at least partially compensate for different rates of thermal expansion in components within a load path to maintain said preload over a predetermined range of operating temperatures, wherein at least one of said first and second metal load distributing elements does not extend fully around said body.

* * * * *

UNITED STATES PATENT AND TRADEMARK OFFICE
CERTIFICATE OF CORRECTION

PATENT NO. : 7,282,006 B2
APPLICATION NO. : 11/705166
DATED : October 16, 2007
INVENTOR(S) : Paul H. Petruska et al.

It is certified that error appears in the above-identified patent and that said Letters Patent is hereby corrected as shown below:

In the Claims:

Column 6, line 14, Claim 13: "Includes" should be --includes--.

Column 6, line 19, Claim 14: "Is" should be --is--.

Column 6, line 25, Claim 15: "alon" should be --along--.

Column 6, Lines 45-47, Claim 16:

"a second bearing coupled to said housing and rotatably supporting said case on a side of said case opposite said first bearing, said second bearing being positioned in said load path;"

should be

--a second bearing coupled to said housing and rotatably supporting said case on a side of said case opposite said first bearing, said second bearing being positioned in said load path;--.

Column 6, line 56, Claim 18: "power transmission device" should be --axle assembly--.

Signed and Sealed this

First Day of July, 2008

JON W. DUDAS
*Director of the United States Patent and Trademark Office*